US009596085B2

(12) United States Patent
Prakash et al.

(10) Patent No.: US 9,596,085 B2
(45) Date of Patent: Mar. 14, 2017

(54) SECURE BATTERY AUTHENTICATION

(71) Applicant: Intel Corporation, Santa Clara, CA (US)

(72) Inventors: Gyan Prakash, Beaverton, OR (US); Venkatesh Ramamurthy, Hillsboro, OR (US); Rajesh Poornachandran, Portland, OR (US); Hong Li, El Dorado Hills, CA (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 14/127,218

(22) PCT Filed: Jun. 13, 2013

(86) PCT No.: PCT/US2013/045593
§ 371 (c)(1),
(2) Date: Dec. 18, 2013

(87) PCT Pub. No.: WO2014/200490
PCT Pub. Date: Dec. 18, 2014

(65) Prior Publication Data
US 2015/0172054 A1    Jun. 18, 2015

(51) Int. Cl.
*G06F 12/14* (2006.01)
*H04L 9/32* (2006.01)
*G06F 21/44* (2013.01)

(52) U.S. Cl.
CPC ............ *H04L 9/3226* (2013.01); *G06F 21/44* (2013.01); *H04L 9/3263* (2013.01); *G06F 2221/2129* (2013.01)

(58) Field of Classification Search
CPC ...... H04L 9/3226; H04L 9/3263; G06F 21/44
See application file for complete search history.

(56) References Cited

U.S. PATENT DOCUMENTS 7,711,960 B2    5/2010  Scarlata
8,843,650 B2 *  9/2014  Song et al. .............. 709/229
(Continued)

FOREIGN PATENT DOCUMENTS

JP    2009187380    8/2009
JP    2011198317    10/2011
WO    2010013090    2/2010

OTHER PUBLICATIONS

PCT International Search Report and Written Opinion issued in corresponding PCT/US2013/045593 dated Mar. 7, 2014, (15 pages).
Webopedia,"Hot Plugging—Hot Swapping", http://www.webopedia.com/TERM/H/hot_plugging.html, 2016, 1 page, IT Business Edge, QuinStreet Enterprise.
(Continued)

*Primary Examiner* — Mohammed Waliullah
(74) *Attorney, Agent, or Firm* — Trop, Pruner & Hu, P.C.

(57) ABSTRACT

An embodiment includes a method executed by at least one processor comprising: an out-of-band cryptoprocessor receiving security credentials from a battery, which is included in a mobile computing node that comprises the at least one processor, while the mobile computing node is engaged in at least one of (a) booting, and (b) exchanging the battery after booting and during run-time; the cryptoprocessor accessing an authentication key; and the cryptoprocessor successfully authenticating the battery, via out-of-band processing, based on the security credentials and the authentication key. In an embodiment the security credentials are included in a certificate. Other embodiments are described herein.

22 Claims, 6 Drawing Sheets

(56) References Cited

U.S. PATENT DOCUMENTS

| | | | |
|---|---|---|---|
| 2003/0188179 | A1 | 10/2003 | Challenger et al. |
| 2004/0117318 | A1 | 6/2004 | Grawrock |
| 2004/0243805 | A1* | 12/2004 | Enokida .................. 713/175 |
| 2005/0235141 | A1 | 10/2005 | Ibrahim |
| 2005/0246552 | A1 | 11/2005 | Bade et al. |
| 2006/0178170 | A1 | 8/2006 | Chung et al. |
| 2008/0059799 | A1 | 3/2008 | Scarlata |
| 2009/0256717 | A1 | 10/2009 | Iwai |
| 2009/0292918 | A1 | 11/2009 | Mori et al. |
| 2011/0093714 | A1 | 4/2011 | Schaecher et al. |
| 2011/0154043 | A1* | 6/2011 | Lim et al. ................ 713/172 |
| 2011/0185171 | A1* | 7/2011 | Karasawa et al. ........... 713/156 |
| 2011/0208529 | A1 | 8/2011 | Jeal et al. |
| 2012/0046015 | A1* | 2/2012 | Little ....................... 455/411 |
| 2012/0284514 | A1* | 11/2012 | Lambert .................... 713/168 |
| 2013/0047209 | A1 | 2/2013 | Satoh et al. |

OTHER PUBLICATIONS

Paul Ridden, "Lenovo Reveals New Business Laptops With Hot Swap Battery Feature", http://newatlas.com/lenovo-fa-thinkpad-business-ultrabooks/28909/, Sep. 2, 2013, 7 Pages, New Atlas, Gizmag Pty Ltd.

Dieter Bohn, "A Closer Look at Google's Modular Phone Prototype", http://www.theverge.com/google/2016/5/20/11723508/google-project-ara-modular-phone-photos-io-2016, May 20, 2016, 9 pages, VOX Media.

Microsoft, "Hot Plugging" 2002, 4 pages, including introductory pages and pp. 257and 258, Microsoft Computer Dictionary Fifth Edition, Microsoft Press, ISBN 0-7356-1495-4, Redmond, Washington.

Korea Intellectual Property Office, Office Action mailed Sep. 13, 2016 in Korean Patent Application No. 10-2015-7032615.

European Patent Office, Extended European Search Report mailed Jan. 3, 2017 in European Patent Application No. 13886976.3.

* cited by examiner

SECURE BATTERY AUTHENTICATION

TECHNICAL FIELD

An embodiment concerns secure computing. More specifically, an embodiment concerns securely integrating a power source with a computing node.

BACKGROUND

Mobile computing nodes provide convenience to users by allowing the users to perform various tasks from a variety of locations. Mobile computing nodes include, for example, cellular phones, smartphones, tablets, Ultrabooks®, notebooks, laptops, personal digital assistants, and mobile processor based platforms. To achieve this convenience many users operate the computing nodes using a mobile power supply such as a battery included within the computing node housing or coupled thereto. Using a battery designed for the computing node helps ensure proper and safe functioning of the computing node. However, using a battery not designed or approved for the computing node can have negative consequences. For example, using an unapproved battery may supply energy to the computing node at an unsafe level (e.g., too high an energy level that may lead to fire or damage to the computing node platform) or insufficient level (which may cause unacceptable performance for the computing node). Furthermore, the battery may introduce malware to the computing node via malicious code included in memory coupled to the battery.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Figure 1:
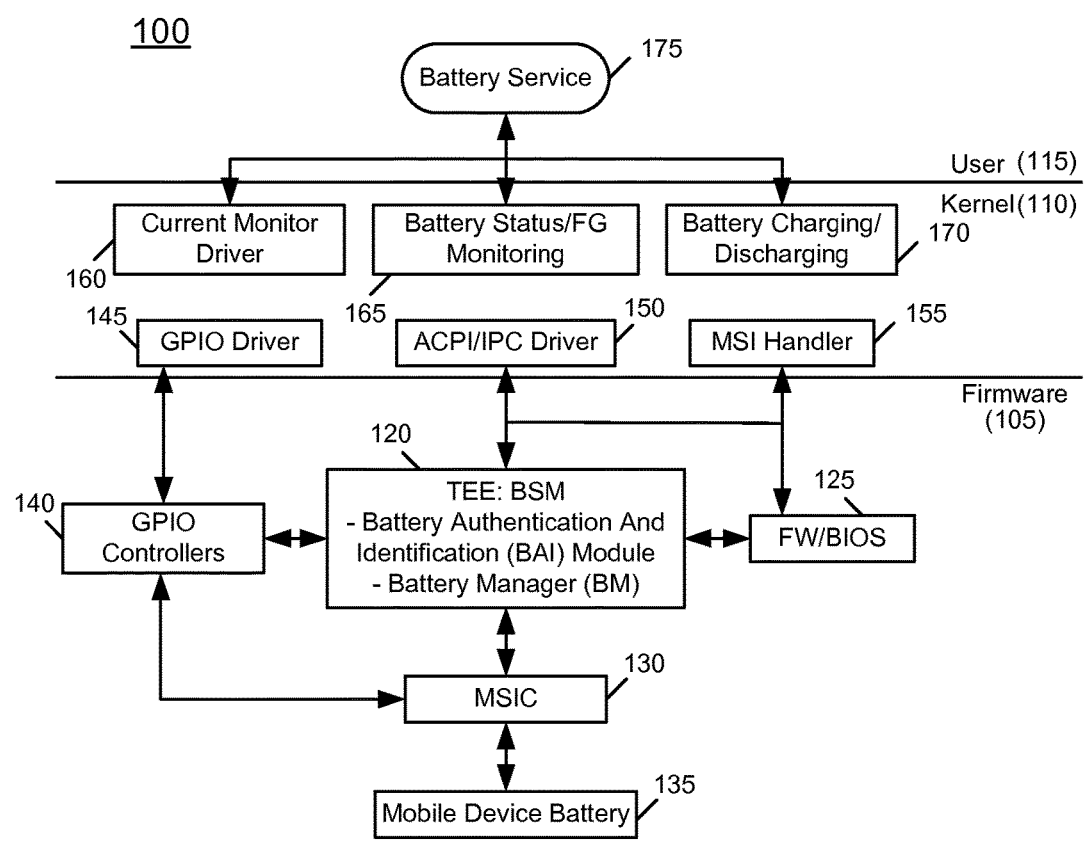
FIG. 1 includes a system architecture in an embodiment of the invention.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted. The phrase "embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Secure battery identification and authentication helps deter or prevent use of an unauthorized battery with a computing node. Unauthorized batteries (e.g., non-certified batteries) may pose unsafe operating conditions that may injure the user and/or the mobile computing platform. Furthermore, malicious software components (introduced to the computing node via instructions stored with an unauthorized battery) running on the platform can improperly modify, for example, battery charging parameters, thereby endangering the life of the end-user and/or the platform.

A "battery status indicator" or "battery size indicator" running in firmware and/or BIOS may perform primitive validation by comparing the battery status or battery size against known values. However, using firmware/BIOS makes this primitive validation dependent on operating system (OS) based components and using OS based components is less secure than many users would like. Furthermore, regardless of exposure to the OS, such methods may not securely provide secure information such as the battery manufacturer, version or model of the battery, lot number of the battery, and the like.

An embodiment includes secure battery authentication that allows only a trusted battery (e.g., certified battery) to be installed and operated on a mobile computing node. The embodiment performs a battery authentication check using a firmware/software/virtual component running in a secure environment, such as a Trusted Execution Environment (TEE). One such TEE includes Intel® Trusted Execution Technology (TXT). A TEE (or otherwise secure environment) may use a Trusted Platform Module (TPM) to perform secure cryptoprocessing that is out-of-band (not subject to OS). Regardless of the specific implementation, whether it be based on a TPM or some other secure environment, an embodiment performs battery authentication using secure cryptography protocols such that, for example, only a battery with an embedded (e.g., in memory included in the battery housing), secure, signed certificate (e.g., X.509 certificate) is allowed to power the mobile device.

In an embodiment battery identification/authentication is performed at pre-boot (i.e., before the booting process for the mobile computing node OS is finished) and/or hot swapping of the battery (e.g., exchanging batteries during OS run-time mode).

In an embodiment the battery is checked against an embedded signed certificate for details such as, for example, the battery manufacturer's identification, an expiration date for the certificate and/or battery, power restrictions (e.g., battery may only charge from source power satisfying a certain voltage or frequency level), a geographic limitation for where the battery may be used (e.g., based on a global position system (GPS) sensed location the battery may be inoperable in certain parts of the world for technical or non-technical reasons), environmental conditions/restrictions such as temperature or humidity (e.g., temperature may be sensed by the mobile device and indicate the battery should not be operated above a threshold temperature or humidity level), and the like. So in various embodiments real time conditions, such as a geographic location for the device or a temperature or humidity reading taken recently, may be used for authentication. Thus, a certificate including any of the above details may be transferred from the battery to a platform. The platform then securely compares those details to corresponding information included in the platform (e.g., information stored in a policy or configuration file located within a TPM or decrypted within a TPM).

FIG. 1 includes an architecture for a mobile computing node 100 in an embodiment. A "battery status indicator" or "battery size indicator" running in firmware and/or BIOS 125 may perform primitive validation by comparing the battery status or battery size against known values and reporting related interrupts via message signal interrupt (MSI) handler 155 to kernel 110.

A firmware 105 component operates inside a secure tamper resistant TEE comprising Battery Security Management (BSM) module 120, which further includes a Battery Authentication and Identification (BAI) module. The BAI module securely identifies and authenticates battery 135 during pre-boot conditions and/or any time battery 135 is swapped or replaced. The BAI module authenticates the battery based on an embedded and signed certificate received from the battery. The BAI exchanges data, such as the certificate, over a hardware interface that facilitates communication between the host (e.g., BSM 120) and battery 135.

Battery Manager (BM) module, also included in BSM 120, enforces policy. Thus, if the BAI module decrypts or "unwraps" a certificate from battery 135, some of the values in the certificate (e.g., an expiration date for the certificate, a version or lot number for the battery) may be compared against corresponding values in the policy of the BM. Thus, a policy of the BM may dictate that only battery version 2.4 or above is acceptable and that upon reading the battery's certificate, the battery is not to be authenticated or deemed valid because it is only version 2.1.

In an embodiment the BM module is responsible for monitoring the battery voltage to ensure that there is a graceful shutdown. This may ensure a shut down occurs before hardware ungracefully shuts down the system due to a battery voltage falling below the "LOWBATT" (low battery) voltage threshold. For example, while monitoring battery 135, if the battery voltage (VBATT) capacity drops below a pre-defined threshold (e.g., a value configurable in TEE configuration space where thresholds are specified by OEM/Manufacturer), energy management policies of the BM will be triggered by a battery control unit (BCU) and battery service 175. Such a "service" may include a software component that is active throughout a system operational mode and which provides battery related services to requesting modules (e.g., Platform Power Manager, Fuel Gauge Monitor, and the like). The BM subsystem may initiate a controlled shutdown when a battery empty/depletion criterion is met.

BSM 120 is responsible for monitoring the battery level and taking actions to prevent battery 135 or platform 100 from getting damaged by over discharging. The monitoring is primarily done in the OS space (kernel 110) even though there are threshold registers in mixed signal integrated circuit (MSIC) 130 that can trigger action. This is primarily because the MSIC thresholds act as a failsafe mechanism to protect the platform if all other mechanisms fail. The software thresholds for shutting down the platform will be higher than the thresholds set in MSIC 130.

In an embodiment battery charging is done while battery charging module (BCM) 170 monitors battery temperature to avoid overheating battery 135. Furthermore, BCM 170 also regulates charging the battery at specified voltages and currents. A power management module, such as MSIC 130, controls battery charging until battery voltage reaches LOW-BATTLS (e.g., =2.7V). BSM 120 controls the battery charging between LOWBATTLS and a boot threshold defined in BSM 120 configurations. MSIC 130 also controls charging in case of an invalid battery and/or when the kernel has been compromised. Battery and charging drivers, such as Advanced Configuration and Power Interface (ACPI) and/or Inter-process communication (IPC) driver 150 controls the battery charging beyond the LOWBATTLS and BSM thresholds levels.

BSM charger detection is handled by BSM module 120, which manages charging until battery 135 reaches the recommended threshold voltage level for the OS boot. Post OS boot USB drivers handle adapter enumeration and negotiating input current from a session description protocol (SDP) adapter (e.g., between 100 mA-500 mA). Adapter insertion/removal is reported to battery service 175, which displays an appropriate status to user level 115 application(s).

Fuel gauge (FG) monitoring module 165 monitors battery conditions (e.g., monitors current via current monitor driver 160) and predicts battery life. This informs the user when there is a low battery condition and warns the user the platform may shutdown soon. Some of the parameters that affect the amount of charge left in the battery are battery type, design capacity (characterized by the discharge curves), battery aging, and temperature. Any of these parameters may be incorporated into a certificate sent between battery 135 and BSM 120, which authenticates the certificate based on comparing values from the certificate with those of the BM policy.

MSIC 130 reads/monitors the battery voltage, battery current, and the amount of charge going in and out of battery 135 using a coulomb counter. These monitored values may be supplied to FG module 165, which then estimates the charge in battery 135. This process is managed by the BM. The value may be supplied to FG module 165 via general purpose input/output (GPIO) controllers 140 and corresponding drivers 145.

Blocks of system 100 are interconnected via open I2C buses.

Figure 2:
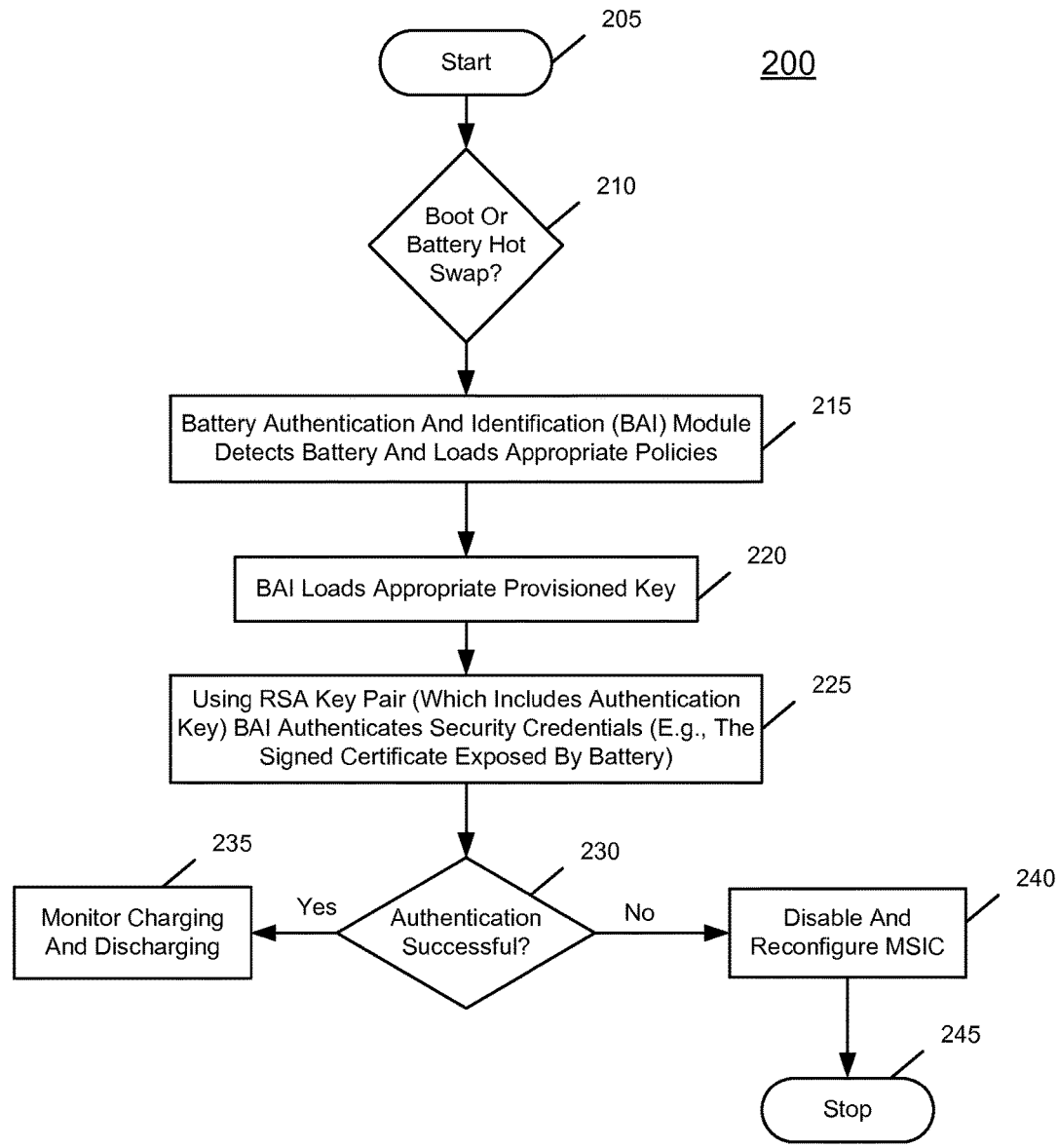
FIG. 2 includes a flow diagram for an embodiment of the invention.

FIG. 2 includes a flow diagram for BSM (see FIG. 1) in an embodiment. Block 205 starts the process and diamond 210 detects (via BAI module of FIG. 1) the presence of a battery during system boot or hot swapping of the battery. In block 215 the BAI loads BM policies and block 220 loads a RSA key or keys from secure storage of a cryptoprocessor, such as a TPM. In block 225 the BAI uses the provisioned RSA key(s) (which, in some embodiments, have been provisioned during manufacturing time by the platform manufacturer/assembler and may generally be referred to as authentication key(s)) to authenticate a signed certificate from the battery. The signed certificate is one example of security credentials, which in various embodiments may include certificates, hashes, measurements, and other systems/mechanisms used to securely identify an entity or product (e.g., a battery, a register configuration). Furthermore, the BAI may perform battery validation based on BM policy settings. This validation based on BM policy settings may be considered part of the authentication process. If authentication fails (see right branch from diamond 230) the BSM disables certain functionality (e.g., the ability to operate the platform at full power) and reconfigures the MSIC to control power levels (blocks 240, 245). The reconfigured values may correspond to operating the system in a limited capacity, such as safe mode. Based on the type of failure the BSM may take actions recommended in policy settings (e.g., BM policy settings) such as, for example, graceful platform shutdown, logging the failure, alerting the user regarding the failure, and the like. Upon successful authentication (block 235), BSM enters into a monitoring mode where it monitors for hot swapping of the battery, battery charging, battery discharging, voltage or current threshold violations, and the like and then take appropriate corresponding actions defined in BM polic(ies).

In an embodiment, the BSM may be located within a secure cryptoprocessor, such as a TPM. As described in U.S. Pat. No. 7,711,960 (assigned to Intel® Corporation, Santa, Clara Calif.), a trusted platform may provide data security functions such as data encryption and decryption and data storage. (U.S. Pat. No. 7,711,960 also addresses updating secure blobs, which is discussed further below.)

A component of a trusted platform is the TPM, a module which may perform cryptographic hashings to detect loss of integrity, public and secret key encryption to prevent unauthorized disclosure of data, and digital signing to authenticate transmitted information. The TPM may have storage, which may be rooted in hardware, to protect keys, secrets and hash values.

A trusted platform may demonstrate it operates in a safe configuration when it has access to confidential data by measuring the configuration and sealing the data to the configuration. The measurements of a configuration may be hashed and stored in Platform Configuration Registers (PCRs). A trusted platform may allow access to data only under a particular configuration of the trusted platform. The TPM seal operation may encrypt data to a specific set of PCR values or an authorization value. To unseal the data, and thereby gain access to it, the authorization must be presented and the set of values stored in the PCRs must match the set used in the seal operation. Similarly, a signing key may be locked to a set of PCR values during key generation within the TPM. Such a key may include, for example, a key used to decrypt a certificate transferred from the battery or related to the battery (and possibly stored in the platform or TPM).

A trusted platform may issue certifications that configurations may be trusted or arrange for the certifications to be issued. One method involves executing the TPM_CertifyKey function on a key locked to a particular configuration. The result may state and certify the configuration that a key is locked to. When a key is not locked to a particular configuration, it may prove difficult to state and certify a configuration under which access to the key is available.

Figure 3:
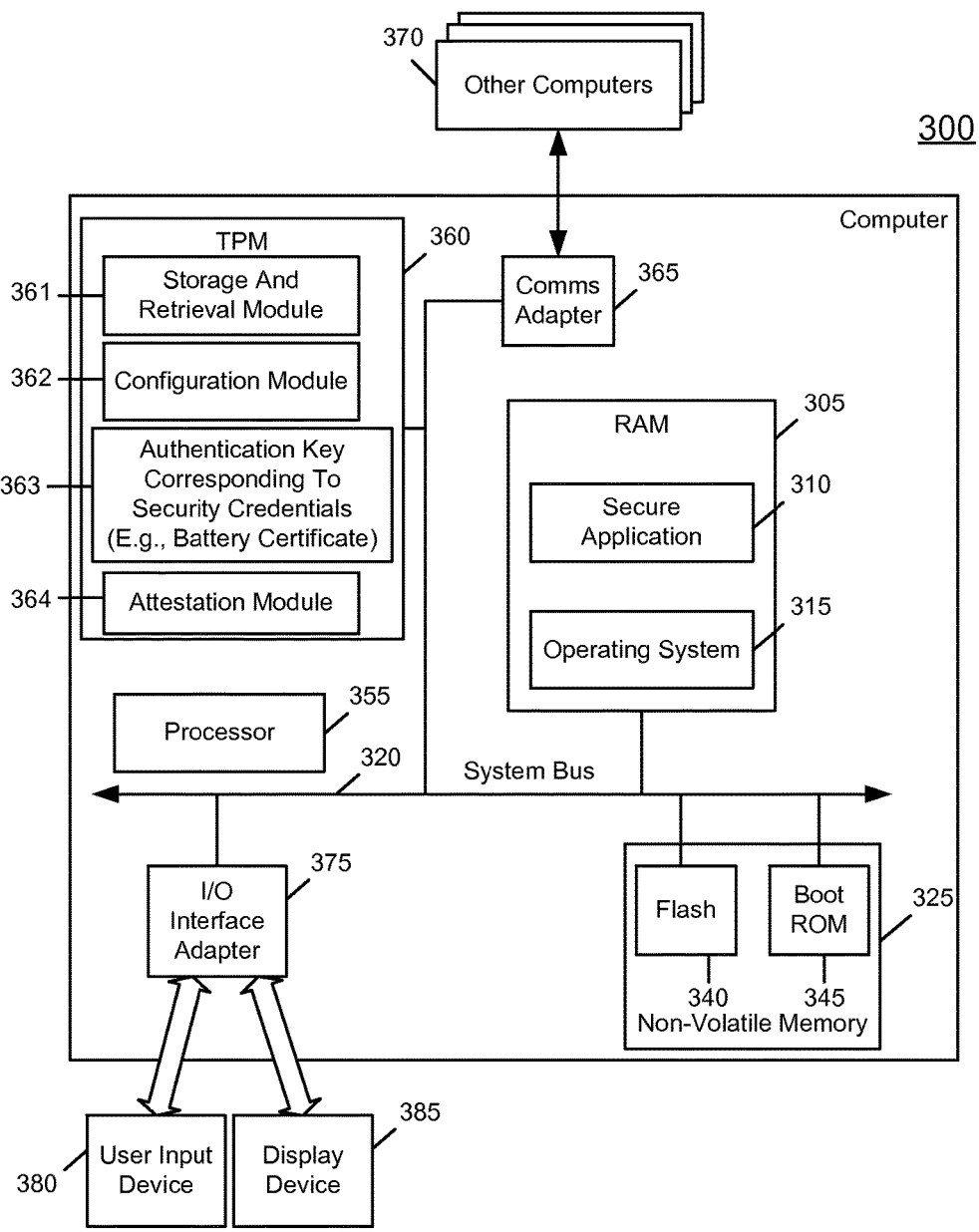
FIG. 3 includes a secure cryptoprocessor architecture in an embodiment of the invention.

Turning now to FIG. 3, there is shown an embodiment of a computing platform 300 capable of controlling access to a cryptographic key by creating an authorization blob binding authorization data for accessing the key to a configuration of the computing platform 300. The key may include a key needed to decrypt a certificate delivered from the battery. The embodiment of a computing platform 300 is also capable of attesting to approved configurations of computing platform 300 by signing a certification of a cryptographic key. This key may be a key other than the key used to decrypt a certificate from the battery. This key may accompany another certificate the platform produces to indicate it has a secure battery/platform configuration.

Computing platform 300 includes both hardware and software. Platform 300 includes random access memory (RAM) 305, non-volatile memory 325, processor 355, TPM 360, communications adapter 365, and Input/Output (I/O) interface adapter 375 connected by system bus 320. Stored in RAM 305 are secure application 310 and OS 315. Secure application 310 may comprise computer program instructions for controlling access to a cryptographic key in TPM 360 and for accessing the cryptographic key (such as a key to decrypt a certificate received from battery). Application 310 may operate by giving commands to be executed by TPM 360. OS 315 may comprise OSs (such as mobile computing node OSs) useful for controlling access to a cryptographic key and for attesting to approved configurations of a computing platform.

Non-volatile memory 325 may include flash memory 340 and boot ROM 345, which consists of software that controls the booting of platform 300. Boot ROM 345 may control the power-on self-test (POST) of platform 300. The POST may perform a series of system checks. The POST may check that boot ROM is operating correctly by comparing code loaded in various portions of platform 300 with code stored in BIOS. During POST, an electrical signal may clear left-over data from registers. It may also set the program instruction counter to a specific address, the address of the next instruction for the processor 355 to begin executing. The address may refer to the beginning of a boot program for the processor 355 stored in the BIOS.

TPM 360 includes storage and retrieval module 361, configuration module 362, cryptographic module 363, and attestation module 364. Storage and retrieval module 361 may store data and permit access to it by programs such as application 310 only upon authorization to make the data available. Configuration module 362 may determine the state of a configuration of computing platform 300 (i.e., "measure" a configuration). Cryptographic module 363 may perform cryptographic functions such as key generation, encryption, and decryption. Module 263 may include a key or keys for decrypting a certificate from the battery. Attestation module 364 may attest to approved configurations of platform 300. TPM 360 may perform its functions in response to commands from secure application 310 and other programs. In some embodiments, TPM 360 may be implemented in hardware. In further embodiments, TPM 360 may consist of a module similar to a smart card. In other embodiments, TPM 360 may be implemented in software.

Communications adapter 365 may implement the hardware level of data communications through which one computer sends data communications to other computers, such as other computers 370, directly or through a wireless network. Examples of communications adapters include 802.11b adapters for wireless network communications.

I/O interface adapter 375 implements user-oriented I/O through, for example, software drivers and computer hardware for controlling output to display devices such as display device 385 as well as user input from user input device 380. User input device 380 may include both a keyboard and a mouse. Some embodiments may include other user input devices such as speech interpreters, bar code scanners, text scanners, tablets, touch screens, and/or other forms of user input devices.

Figure 4:
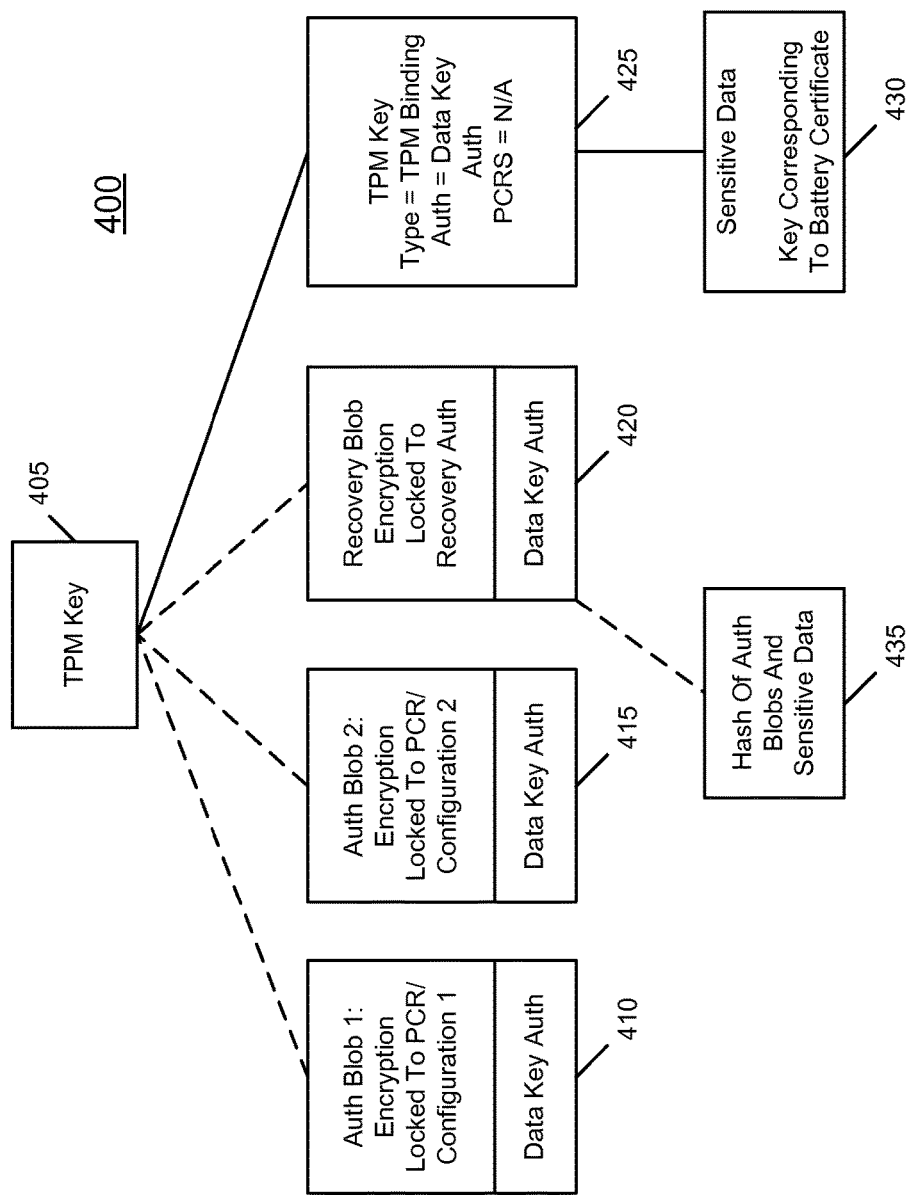
FIG. 4 includes a relationship diagram for secure modules in an embodiment of the invention.

FIG. 4 depicts an exemplary data diagram 400 for controlling access to a cryptographic key, such as a key for decrypting a certificate from the battery (which may be located in module 363 of FIG. 3). The diagram includes TPM key 405, authorization blobs 410 and 415, recovery blob 420, TPM key 425, sensitive data 430 (which may include a key to decrypt a certificate communicated to the platform by a battery), and hash 435. TPM key 405 is a cryptographic key which may be used to encrypt other data structures such as blobs 410, 415, and 420 and TPM key 425. In some embodiments, TPM key 405 may comprise a TPM storage key. A TPM storage key may consist of an asymmetric key used to encrypt data or other keys. TPM storage keys may form a hierarchy. The TPM storage root key may form the root of the hierarchy. Child keys may be wrapped by parent keys. In other embodiments, TPM key 405 may be generated outside of the TPM and imported into the TPM.

Blobs 410, 415, 420 are data structures which may be generated by a TPM for external storage of data. In an embodiment, blob 410 is locked to configuration 1 of a TPM (represented by a first set of values of PCRs), blob 415 is locked to configuration 2 of the TPM, and blob 420 is locked to recovery authorization (authorization data which may be possessed by a recovery authority). Recovery authority may have authority to access sensitive data in an emergency, such as a failed attempt to update a configuration of a computing platform (e.g., battery replacement) containing a TPM or a system problem with the computing platform. The recovery authority may consist of a corporate information technology (IT) department. Each of blobs 410, 415, and 420 contains "data key auth" (authorization data (e.g., a key) to unlock TPM key 425). Unlocking any of blobs 410, 415, 420 may make data key auth available to unlock TPM key 425. Accordingly, blobs 410, 415, and 420 constitute a type of authorization blob.

TPM key 425 is a TPM key used to encrypt sensitive data 430, which may include a key for decrypting a certificate from the battery. TPM key 425 may consist of a TPM storage key. TPM key 425 may be encrypted by TPM key 405. Presentation of data key auth may be needed to unlock or decrypt TPM key 425, thereby making TPM key 425 available for unlocking sensitive data 430. Sensitive data 430 may include a public key for decrypting the certificate sent by the battery to the platform (or a private key for decrypting the certificate sent by the battery to the platform).

The data structures of FIG. 4 may enable the unlocking of TPM key 425 to decrypt sensitive data 430 in multiple configurations of a computing platform containing a TPM. When an application that uses sensitive data is launched, the application may scan through auth blob 410 and auth blob 415 in the storage area for the auth blobs until it finds one that is locked to the values currently in the TPM PCRs. Each of these blobs may correspond to a differently configured battery, thus allowing a platform to operate with numerous batteries. If the application finds an auth blob locked to the current PCR values (such as PCR values on a battery or off the battery but related thereto), the application may decrypt the data key auth contained in the blob, and may use data key auth to unlock TPM key 425 to decrypt sensitive data 430. In further embodiments, the application able to access the sensitive data 430 in multiple configurations may consist of a virtual TPM, a logical device that provides TPM-like functionality.

If the current configuration is not one that is approved to access the data, unlocking auth blobs 410, 415 may not be possible. Recovery blob 420 may, however, enable accessing sensitive data 430 regardless of the platform configuration. The providing of recovery auth may unlock recovery blob 420, thereby making data key auth available for unlocking TPM key 425.

The data structures of FIG. 4 may be modified to enable access to sensitive data 430 from configurations in addition to those to which auth blobs 410 and 415 are sealed. In order to enable the access to sensitive data 430 by another platform configuration (e.g., for a configuration for a newly released battery that a trusted party wishes to function with an already released platform), an application using sensitive data 430 may obtain the PCR values that the platform may have under the other platform configuration (e.g., the PCR values that will be present once the newly released battery is loaded into the platform). For example, the other platform configuration may be installed and the PCR values measured. As another example, an upgrade service may install the other platform configuration upon a platform identical to the platform containing the TPM and may measure the configuration upon the other platform. The two platforms may have the same PCR values. The upgrade service may then provide the measurements to the application. The application may create new auth blob by encrypting a new copy of data key auth, locking it to the PCR values representing the other platform configuration. In some embodiments, the application which creates a new auth blob may consist of a virtual TPM.

An application making sensitive data 430 available under a configuration may desire some assurance that the configuration is as safe as previous configurations under which access to sensitive data 430 is available. The application may rely on an upgrade service, an authority which may be trusted to analyze the configuration and determine that it is as safe as the previous configuration. During initial creation of sensitive data 430, a public key for the upgrade service may be injected into the sensitive data (this may be performed by the original equipment manufacturer (OEM) for the platform). Thus, sensitive data may include one or more keys (e.g., a key to decrypt a certificate from a battery, a public key to unlock/unwrap/decrypt upgrade blobs from an update service such as the platform manufacturer, and the like). Before creating an auth blob for an additional configuration, the application may require signed approval by the upgrade service of the additional configuration.

The data structures of FIG. 4 may also be modified to delete an auth blob to prevent access to sensitive data under the configuration the auth blob is sealed to (e.g., a battery previously approved of but which is no longer approved due to a history of technical issues and the like). For example, after a computing platform is updated, an auth blob locked to an outdated configuration may be deleted. In order to ensure that a cached version of an old auth blob is not used after deletion, an anti-replay mechanism may be used. An example mechanism may compare a hash of the most recently-updated set of auth blobs and sensitive data (e.g., key or keys) to a hash of the currently loaded auth blobs and sensitive data. The equality of the two hashes may indicate that the currently loaded auth blobs are a fresh set and not a cached old set. A hash is a mathematical operation to transform a string or message into a fixed-length output string. The hash function is devised to make it very difficult to find a message whose hash produces a given message digest. Thus, if hashes of two messages are equal, the likelihood is strong that the messages are equal.

An application that uses sensitive data 430 may hash the auth blobs and sensitive data each time the application modifies the auth blobs. The application may then store the resulting hash 435 in non-volatile storage, such as TPM non-volatile RAM or a data integrity register (DIR). A DIR may comprise another form of TPM non-volatile storage. Hash 435 may also be stored outside of the TPM. On each boot, the application may calculate a hash of the current auth blobs and sensitive data. If the hash of the current state matches hash 435, the hash of auth blobs and sensitive data stored at a previous update, then the auth blobs 410, 415 and sensitive data 430 may be fresh.

Figure 5:
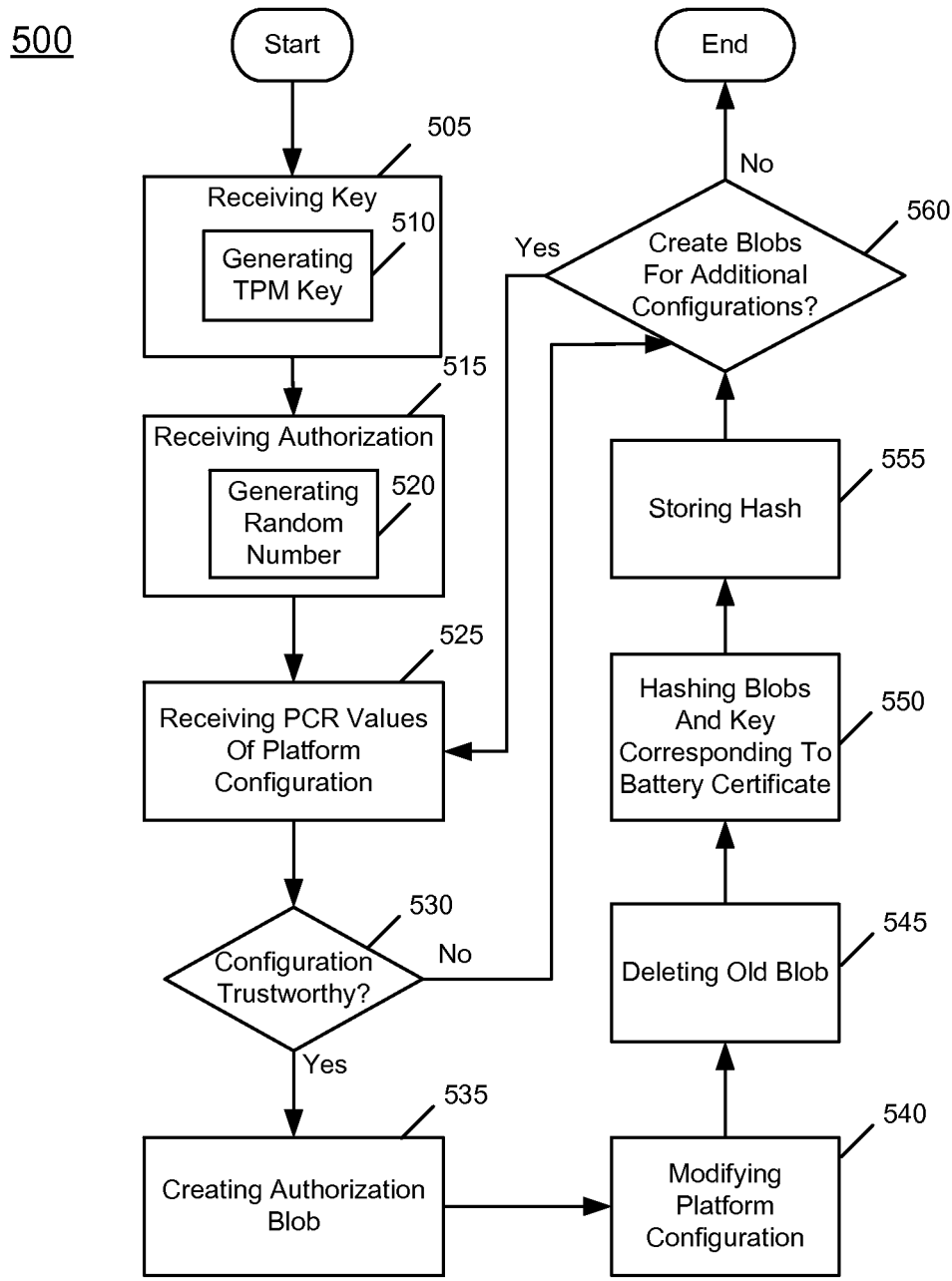
FIG. 5 includes a flow diagram for updating authentication credentials in an embodiment of the invention.

FIG. 5 includes method 500, which comprises receiving a cryptographic key (box 505) by an application which utilizes TPM functions to control access to a cryptographic key (such as a key for decrypting a certificate from a battery). The key of box 505 may be "received" by being embedded by the platform manufacturer at the time of building/assembling the platform. In some embodiments, the cryptographic key may be received from a TPM which generates the key (box 510). In other embodiments, the cryptographic key may be received from other sources. For example, the application may itself create a cryptographic key.

Box 515 includes receiving authorization for the use of the cryptographic key. Presentation of the authorization may permit use of the cryptographic key available for decryption. In some embodiments, the authorization may be created by generating a random number (block 520). Built-in functions on a TPM, for example, may generate random 160-bit numbers. In other embodiments, the authorization may consist of a password or a hash of a password.

Block 525 includes receiving PCR values of a platform configuration (e.g., a battery configuration). In some embodiments, the application may receive the PCR values by obtaining the values after the computing platform is placed in the configuration and the PCR values are measured. In other embodiments, the PCR values may be obtained from an upgrade service.

The application may determine whether the configuration (e.g., battery configuration) is trustworthy (element 530). For example, the application may receive the configuration from a trusted upgrade service (and use the key from block 505 to decrypt the information from the trusted upgrade service) or the configuration may comprise software from a trusted vendor. If the configuration may be trusted the application may create an encrypted authorization blob (element 535) which contains the authorization and is bound to the PCR values of the configuration. The blob may be decrypted only when the PCR values of a TPM match the PCR values to which the blob is locked. If the configuration is not trustworthy, the application may determine whether to create blobs for additional configurations (element 560).

In some embodiments, the computing platform may be modified to install software or firmware forming a component of the configuration for which PCR values were received (element 540). One or more applications, other software, or firmware installed on the computing platform may be upgraded; additional applications, software, or components of firmware may be added or deleted; or a newer version of software or firmware may be replaced with an older version. A blob representing a former configuration (old blob) may be deleted (element 545). For example, the old blob may represent an obsolete battery configuration that was upgraded. In alternative embodiments, however, the old blob may be retained. The old configuration may represent one of several alternative configurations in which a computing platform may be operated.

In order to ensure that a cached version of the deleted old blob is not used to gain access to the sensitive data, an anti-replay mechanism may be used. Once the authorization blobs are updated with the newly-created authorization blob (element 540), the set of authorization blobs for the key and the sensitive data (e.g., key corresponding to battery certificate) protected by the key may be hashed (element 550). The hash may be stored in non-volatile storage, such as in a DIR or other non-volatile storage of a TPM or in other non-volatile storage on the computing platform (element 555). Thereafter, when the application controlling sensitive data is booted, the application may calculate a hash of the current authorization blobs and sensitive data and compare the hash to the stored hash. If the hashes match, then the authorization blobs are the current set and not an old cached set.

If there are additional configurations to grant access to the sensitive data (element 560), each element of flowchart 500 from element 525 to element 555 may be repeated. Otherwise, controlling access to a cryptographic key may end.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions. An apparatus for processing instructions may be configured to perform any of the methods described herein. And an apparatus may further include means for performing any of the methods described herein.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods, or (b) at least one storage medium having instructions stored thereon for causing a system to perform the methods. The term "machine readable medium" or "storage medium" used herein shall include any medium that is capable of storing or encoding a sequence of instructions for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving storage. A medium may include any mechanism for storing, transmitting, or receiving information in a form readable by a machine, and the medium may include medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 6:
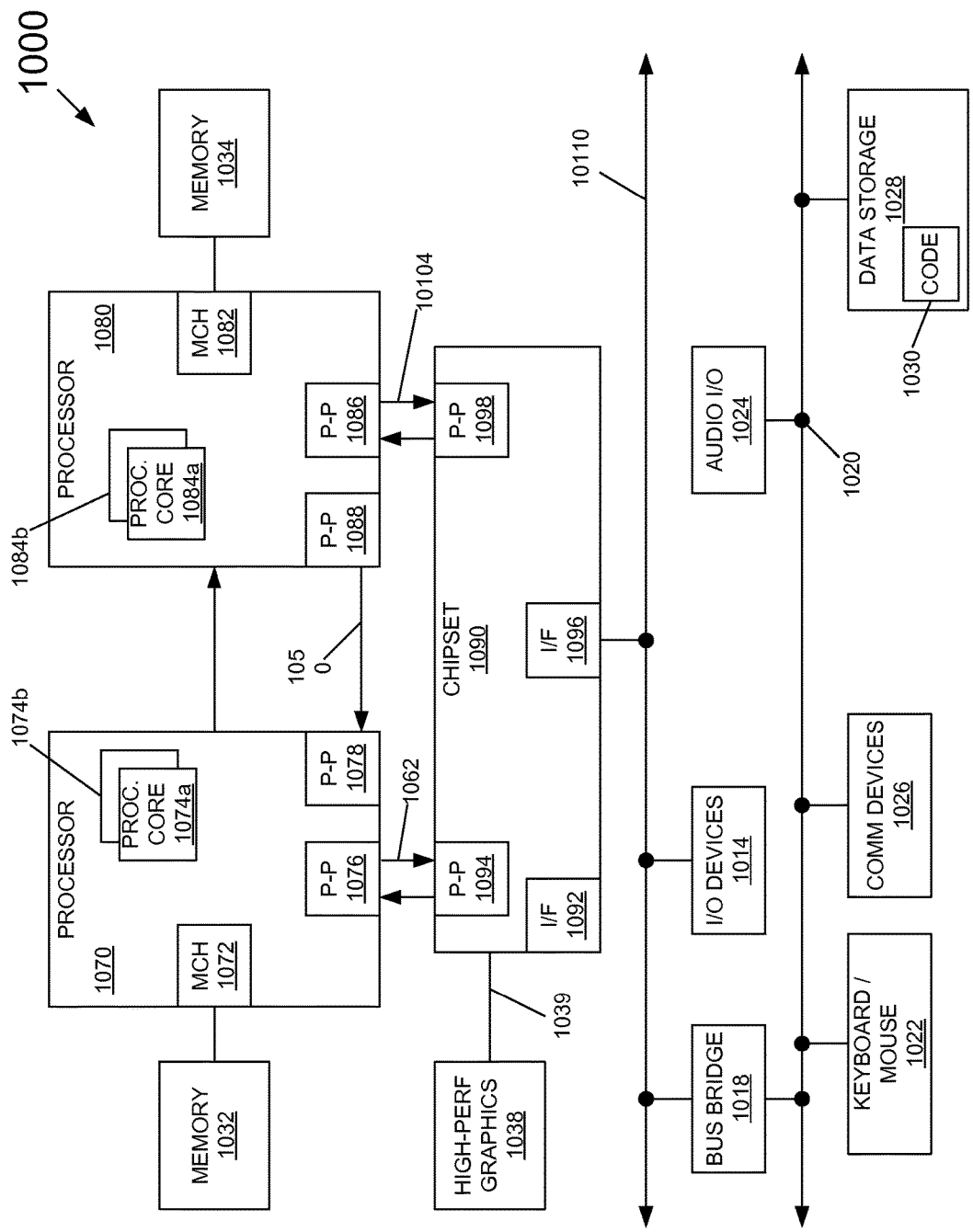
FIG. 6 includes a system for use with an embodiment of the invention.

Referring now to FIG. 6, shown is a block diagram of a system embodiment 1000 in accordance with an embodiment of the present invention. Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discrete logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components to one another. In an embodiment a bus may be used to couple a TPM or other out-of-band cryptoprocessor (not shown) to I/O subsystem 1090.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of the Figure may alternatively be partitioned using more or fewer integrated chips than shown in the Figure.

Example 1 includes a method executed by at least one processor comprising: an out-of-band cryptoprocessor receiving security credentials from a battery, which is included in a mobile computing node that comprises the at least one processor, while the mobile computing node is engaged in at least one of (a) booting, and (b) exchanging the battery after booting and during run-time; the cryptoprocessor accessing an authentication key; and the cryptoprocessor successfully authenticating the battery, via out-of-band processing, based on the security credentials and the authentication key. In an embodiment the authentication key may be implanted or embedded in the TPM by an OEM during manufacture of the mobile computing node. Furthermore, accessing the key may include generating the key and then accessing the key. The cryptoprocessor successfully authenticating the battery "based on" the security credentials and the authentication key includes directly or indirectly based on the credentials. For example, additional credentials derived (e.g., hashed, concatenated with other information, and the like) from the transferred credentials may be used for authentication.

In example 2 the subject matter of the Example 1 can optionally include wherein the security credentials include a certificate.

In example 3 the subject matter of Examples 1-2 can optionally include wherein the certificate includes a certificate value comprising at least one of an expiration date for the certificate, a voltage restriction for the battery, an atmospheric restriction for the battery, a version identifier for the battery, an identifier for a vendor of the battery, and a geographic restriction for the battery.

In example 4 the subject matter of Examples 1-3 can optionally include determining a real time condition for the mobile computing node; and authenticating the battery based on comparing the real time condition and the certificate value. For example, the certificate value may include a geographic limiter (e.g., battery may only be utilized in country Z) and the node may determine the node is located in a country not included in the certificate, and proceed to gracefully shut down the node.

In example 5 the subject matter of Examples 1-4 can optionally include updating the certificate with an additional certificate. A new battery may include a new certificate. As shown in FIG. 5 a new key (block 550) may be provisioned to the platform, the new key corresponding to the new certificate with the new battery.

In example 6 the subject matter of Examples 1-5 can optionally include successfully authenticating the battery before updating the certificate and not rebooting the mobile computing node between successfully authenticating the battery and updating the certificate. Thus, in one embodiment a prior certificate may need to be authenticated before another certificate is authenticated, all without rebooting a platform between authentications. In one embodiment a prior certificate may need to be authenticated before another certificate is received, all without rebooting a platform between authentications.

In example 7 the subject matter of Examples 1-6 can optionally include receiving the additional certificate from an additional computer node. Such a node may be included in the cloud.

In example 8 the subject matter of Examples 1-7 can optionally the mobile computing node sending an additional certificate, which attests to the authenticity of the battery, to an additional computing node. The additional certificate may attest to security of the platform/battery combination.

In example 9 the subject matter of Examples 1-8 can optionally include authenticating the battery based on comparing a hashed value for the battery with an additional hashed value stored in registers located within the cryptoprocessor; wherein the hashed valued for the battery is at least one of (a) received from the battery, and (b) based on information received from the battery. In an embodiment, the hashed value may be included in a certificate or separate and apart from any certificate.

In another embodiment of example 9, both the device and the battery may authenticate themselves to a cloud based server to obtain a base key that they respectively use in authentication (e.g., to decrypt a certificate from a newly released battery that includes a never-before seen certificate/newly released certificate).

In example 10 the subject matter of Examples 1-9 can optionally include wherein the security credentials include a measurement of a configuration of the battery. Such a measurement may be based on, for example, registers included in the battery housing/package.

In example 11 the subject matter of Examples 1-10 can optionally include operating the mobile computing node in a first mode when the cryptoprocessor successfully authenticates a battery and in a second mode when the cryptoprocessor unsuccessfully authenticates a battery, the second mode having more functionality than completely powering down the mobile computing node but less functionality than the first mode. For example, an embodiment may include allowing a platform to work in an unhindered mode if the battery is authenticated but only in a safe mode, where privilege level access is restricted and overall functionality is reduced, if the batter is not authenticated.

In example 12 the subject matter of Examples 1-11 can optionally include wherein the battery is included in a battery housing and the security credentials are based on information stored in registers located within at least one of the battery housing and the cryptoprocessor. An embodiment may have credentials based on the register information by including a measurement of the registers, a hash of that measurement, a concatenation of the measurement of the registers with a random number, and the like.

In example 13 the subject matter of Examples 1-12 can optionally include wherein the cryptoprocessor includes one of a hardware TPM, software TPM, and a virtual TPM.

In example 14 the subject matter of Examples 1-13 can optionally include receiving additional security credentials from an additional computer node, and the cryptoprocessor successfully authenticating an additional battery, included in the mobile computing node, based on the additional security credentials and at least one of the authentication key and an additional authentication key. Thus, in an embodiment a new battery with different register settings may be introduced to the platform. A platform may receive a new blob that includes the additional security credentials. The platform may use these additional credentials to authenticate the new battery's register settings (or some derived rendition thereof). The platform may access the new battery's register settings by decrypting a certificate including those settings using a key used to decrypt previous certificates or a new key used for the new certificate.

In example 15 the subject matter of Examples 1-14 can optionally include the cryptoprocessor successfully authenticating the battery based on a first value included in the security credentials and a second value, corresponding to the first value, included in a configuration file comprised within the mobile computing node. Thus, in an embodiment a value such as a voltage setting (e.g., voltage within a certain range) included in the certificate may be compared, directly or indirectly, against a value in a configuration file.

In example 16 the subject matter of Examples 1-15 can optionally include wherein the configuration file is stored within the cryptoprocessor. For example, the file may be located within secure storage of a TPM. However, the file may instead be located in the cloud.

In example 17 the subject matter of Examples 1-16 can optionally include the cryptoprocessor: receiving additional security credentials from an additional battery; receiving an additional authentication key; and successfully authenticating the additional battery, via out-of-band processing, based on the additional security credentials and the additional authentication key. The additional key may be received via, in one embodiment, an update blob. The update blob may include other factors to compare with information transmitted to the node via a certificate.

In example 18 the subject matter of Examples 1-17 can optionally include wherein the security credentials include at least one of a measurement of a configuration of the battery and information based on the measurement.

In example 19 the subject matter of Examples 1-18 can optionally include the cryptoprocessor: receiving additional authentication information; and successfully authenticating at least one of the battery and an additional battery, via out-of-band processing, based on the additional authentication information. The additional authentication information may be received via, in one embodiment, an update blob. The update blob may include other factors to compare with information transmitted to the node via a certificate.

Example 20 includes an apparatus comprising a mobile computing node further comprising: a battery; and an out-of-band cryptoprocessor coupled to the battery; wherein the cryptoprocessor is to: (i) receive security credentials while the mobile computing node is engaged in at least one of (i)(a) booting, and (i)(b) exchanging the battery after booting and during run-time; (ii) access an authentication key; and (iii) successfully authenticate the battery, via out-of-band processing, based on the security credentials and the authentication key.

In example 21 the subject matter of Example 20 can optionally include wherein the cryptoprocessor is to: receive additional security credentials from an additional battery; receive an additional authentication key; and successfully authenticate the additional battery, via out-of-band processing, based on the additional security credentials and the additional authentication key.

In example 22 the subject matter of Examples 20-21 can optionally include wherein the cryptoprocessor is to: receive additional authentication information; and successfully authenticate at least one of the battery and an additional battery, via out-of-band processing, based on the additional authentication information.

Example 23 includes at least one storage medium having instructions stored thereon for causing an out-of-band cryptoprocessor to: receive security credentials from a battery, which is included in a mobile computing node that comprises the cryptoprocessor, while the mobile computing node is engaged in at least one of (a) booting, and (b) exchanging the battery after booting and during run-time; access an authentication key; and successfully authenticate the battery, via out-of-band processing, based on the security credentials and the authentication key.

In example 24 the subject matter of Example 23 can optionally include instructions to cause the cryptoprocessor to: receive additional security credentials from an additional battery; receive an additional authentication key; and successfully authenticate the additional battery, via out-of-band processing, based on the additional security credentials and the additional authentication key.

In example 25 the subject matter of Examples 23-24 can optionally include instructions to cause the cryptoprocessor to: receive additional authentication information; and successfully authenticate at least one of the battery and an additional battery, via out-of-band processing, based on the additional authentication information.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions thereon for causing a system to perform operations comprising:
    an out-of-band cryptoprocessor receiving security credentials from a battery, which is included in a mobile computing node that comprises the cryptoprocessor, while the mobile computing node is engaged in hot swapping the battery and not during booting of the mobile computing node;
    the cryptoprocessor accessing an authentication key; and
    the cryptoprocessor successfully authenticating the battery, via out-of-band processing, based on the security credentials and the authentication key.

2. The at least one medium of claim 1, wherein the security credentials include a certificate.

3. The at least one medium of claim 2, wherein the certificate includes a certificate value comprising at least one of a voltage restriction for the battery, a power restriction for the battery, an atmospheric restriction for the battery, a version identifier for the battery, an identifier for a vendor of the battery, and a geographic restriction for the battery.

4. The at least one medium of claim 3, the operations comprising:
    determining a real time condition for a physical environment surrounding an exterior surface of an outermost chassis that includes the mobile computing node; and
    authenticating the battery based on comparing the real time condition and the certificate value.

5. The at least one medium of claim 2, the operations comprising updating the certificate with an additional certificate.

6. The at least one medium of claim 5, the operations comprising successfully authenticating the battery before updating the certificate and not rebooting the mobile computing node between successfully authenticating the battery and updating the certificate.

7. The at least one medium of claim 2, the operations comprising the mobile computing node sending an additional certificate, which attests to the authenticity of the battery, to an additional computing node.

8. The at least one medium of claim 1, the operations comprising the cryptoprocessor:
    receiving additional security credentials from an additional battery;
    receiving an additional authentication key; and
    successfully authenticating the additional battery, via out-of-band processing, based on the additional security credentials and the additional authentication key.

9. The at least one medium of claim 1, the operations comprising authenticating the battery based on comparing a hashed value for the battery with an additional hashed value stored in registers located within the cryptoprocessor; wherein the hashed valued for the battery is at least one of (a) received from the battery, and (b) based on information received from the battery.

10. The at least one medium of claim 1, wherein the security credentials include at least one of a measurement of a configuration of the battery and information based on the measurement.

11. The at least one medium of claim 1, the operations comprising operating the mobile computing node in a first mode when the cryptoprocessor successfully authenticates a battery and in a second mode when the cryptoprocessor unsuccessfully authenticates a battery, the second mode having more functionality than completely powering down the mobile computing node but less functionality than the first mode.

12. The at least one medium of claim 1 wherein the battery is included in a battery housing and the security credentials are based on information stored in registers located within at least one of the battery housing and the cryptoprocessor.

13. The at least one medium of claim 1 wherein the cryptoprocessor includes one of a hardware trusted platform module (TPM), a software TPM, and a virtual TPM.

14. The at least one medium of claim 1, the operations comprising:
    receiving additional security credentials from an additional computer node, and
    the cryptoprocessor successfully authenticating an additional battery, included in the mobile computing node, based on the additional security credentials and at least one of the authentication key and an additional authentication key.

15. The at least one medium of claim 1, the operations comprising the cryptoprocessor successfully authenticating the battery based on a first value included in the security credentials and a second value, corresponding to the first value, included in a configuration file comprised within the mobile computing node.

16. The at least one medium of claim 1, the operations comprising the cryptoprocessor:
receiving additional authentication information; and
successfully authenticating an additional battery, via out-of-band processing, based on the additional authentication information.

17. An apparatus comprising a mobile computing node further comprising:
a battery; and
an out-of-band cryptoprocessor coupled to the battery;
wherein the cryptoprocessor is to: (i) receive security credentials while the mobile computing node is engaged in at least one of (i)(a) booting, and (i)(b) exchanging the battery after booting and during runtime; (ii) access an authentication key; and (iii) successfully authenticate the battery, via out-of-band processing, based on the security credentials and the authentication key;
wherein the mobile computing node is to send a certificate, which attests to the authenticity of the battery, to an additional computing node.

18. The apparatus of claim 17 wherein the cryptoprocessor is to:
receive additional security credentials from an additional battery;
receive an additional authentication key; and
successfully authenticate the additional battery, via out-of-band processing, based on the additional security credentials and the additional authentication key.

19. The apparatus of claim 17 wherein the cryptoprocessor is to:
receive additional authentication information; and
successfully authenticate at least one of the battery and an additional battery, via out-of-band processing, based on the additional authentication information.

20. A method executed by at least one secure cryptoprocessor comprising:
receiving security credentials from a battery, which is included in a mobile computing node that comprises the cryptoprocessor, while the mobile computing node is engaged in hot swapping the battery and not during booting of the mobile computing node;
accessing an authentication key; and
successfully authenticating the battery, via out-of-band processing, based on the security credentials and the authentication key.

21. The method of claim 20 comprising the cryptoprocessor:
receiving additional security credentials from an additional battery;
receiving an additional authentication key; and
successfully authenticating the additional battery, via out-of-band processing, based on the additional security credentials and the additional authentication key.

22. The method of claim 20 comprising the cryptoprocessor:
receiving additional authentication information; and
successfully authenticating at least one of the battery and an additional battery, via out-of-band processing, based on the additional authentication information.

* * * * *